United States Patent
Anti et al.

(10) Patent No.: US 12,280,817 B2
(45) Date of Patent: Apr. 22, 2025

(54) TDR-BASED SYSTEM FOR HAND OR BODY PART POSITIONING DETECTION ON AN OBJECT, PARTICULARLY ON A STEERING WHEEL

(71) Applicant: IEE INTERNATIONAL ELECTRONICS & ENGINEERING S.A., Echternach (LU)

(72) Inventors: Baptiste Anti, Hettange-Grande (FR); Laurent Lamesch, Reichlange (LU); Thomas Faber, Schweich (DE); Thomas Stifter, Trier (DE); Michael Puetz, Trier (DE); Andreas Fox, Freudenburg (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 233 days.

(21) Appl. No.: 17/915,013

(22) PCT Filed: Mar. 25, 2021

(86) PCT No.: PCT/EP2021/057855
§ 371 (c)(1),
(2) Date: Sep. 27, 2022

(87) PCT Pub. No.: WO2021/191400
PCT Pub. Date: Sep. 30, 2021

(65) Prior Publication Data
US 2023/0150564 A1    May 18, 2023

(30) Foreign Application Priority Data
Mar. 27, 2020 (LU) .......................... 101717

(51) Int. Cl.
*B62D 1/04* (2006.01)

(52) U.S. Cl.
CPC .................................. *B62D 1/046* (2013.01)

(58) Field of Classification Search
CPC ....................................................... B62D 1/046
(Continued)

(56) References Cited

U.S. PATENT DOCUMENTS

2003/0189493 A1  10/2003  Klausner et al.
2017/0334477 A1*  11/2017  Bossler ................ G01D 5/2417
(Continued)

FOREIGN PATENT DOCUMENTS

EP            1292485 B1   6/2001
WO      2016096815 A1    6/2016
(Continued)

OTHER PUBLICATIONS

International Search Report for PCT/EP2021/057855, dated May 11, 2021, 3 pages.
(Continued)

*Primary Examiner* — Yazan A Soofi
(74) *Attorney, Agent, or Firm* — Reising Ethington P.C.

(57) ABSTRACT

A sensing system for hand or body part positioning detection on an object, particularly on a rim of a steering wheel, includes at least one electrically conducting signal line that is arrangeable on a surface of the object with a priori knowledge about a relation between a distance of any portion of the at least one signal line from a reference point and information on a position on the object, a signal voltage source for providing a time-dependent measurement signal to be traveling along the signal line, and a control and evaluation unit. From a received reflected measurement signal, the control and evaluation unit determines a position or positions on the object of a portion or portions of the signal line at least partially reflecting the measurement
(Continued)

signal. Based on the determined position or positions, a hand or body part positioning on the object is determined.

15 Claims, 8 Drawing Sheets

(58) Field of Classification Search
USPC .......................................................... 701/41
See application file for complete search history.

(56) References Cited

U.S. PATENT DOCUMENTS

2020/0377137 A1* 12/2020 Lamesch ................ B62D 1/046
2023/0347964 A1* 11/2023 Anti ....................... B62D 1/046

FOREIGN PATENT DOCUMENTS

WO      2019086388 A1    5/2019
WO      2019229034 A1    12/2019

OTHER PUBLICATIONS

Written Opinion for PCT/EP2021/057855, dated May 11, 2021, 7 pages.

* cited by examiner

TDR-BASED SYSTEM FOR HAND OR BODY PART POSITIONING DETECTION ON AN OBJECT, PARTICULARLY ON A STEERING WHEEL

TECHNICAL FIELD

The invention relates to a sensing system for hand or other body part positioning detection on an object, particularly on a steering wheel, a steering wheel with hand or body part positioning detection comprising such sensing system, a method of detecting a hand or body part positioning by operating such sensing system and a software module for automatically carrying out such method.

BACKGROUND

In the field of automotive vehicle sensor applications, it is known to employ sensors for so-called Hands off Detection (HOD) systems, in which one or more sensors provide information about whether a driver has his hands on a steering wheel of a vehicle or not. This information can be provided as input to an Automatic Driver Assistance System (ADAS) such as an Adaptive Cruise Control (ACC), which, based on the provided sensor signal, can alert the driver and remind him or her to take control of the steering wheel again. In particular, such HOD systems can be used in support to fulfill a requirement of the Vienna convention that the driver must remain in control of the vehicle at all times. HOD systems may as well be employed in a parking assistance system or an ADAS that is configured for evaluating a driver activity at high speed.

It is further known to employ capacitive sensors in vehicle HOD systems.

By way of example, WO 2016/096815 A1 proposes a planar flexible carrier for use in steering wheel heating and/or sensing of the presence of the driver's hand(s) on the steering wheel. The planar carrier, which can be employed for mounting on a rim of a steering wheel without wrinkles, comprises a portion of planar flexible foil of roughly rectangular shape having two longitudinal sides and two lateral sides. A length B of the lateral sides is 0.96 to 1.00 times the perimeter of the rim. A number of N cut-outs per unit length are provided on each of the longitudinal sides, wherein the cut-outs of one side are located in a staggered fashion relative to opposing cut-out portions on the opposite side. The determining of an optimum shape and size of the cut-outs is described. Further described is a heat carrier, a heating and/or sensing device and methods for their production.

Multi-zone HOD capacitive sensor systems are known in the art that comprise a plurality of distinct and independent sensing zones along the steering wheel. These HOD capacitive sensor systems are capable of distinguishing various ways of holding the vehicle steering wheel by the driver (one hand, two hands, angular position).

For instance, European patent EP 1 292 485 B1 describes a steering wheel for a vehicle, which comprises a steering ring, a hub, and at least one spoke connecting the steering ring and the hub. On the steering ring, sensors are arranged in a distributed manner along the circumference of the steering ring, extending over the entire length of the steering ring. The sensors may be configured for operating on a resistive, capacitive or inductive basis. The sensors are subdivided into a plurality of segments arranged one behind another in the longitudinal direction of the steering ring. The spacing between two segments of a sensor from one another in the longitudinal direction of the steering ring is smaller than a finger width, wherein the segments of the sensors, in the longitudinal direction of the steering ring, are shorter than a finger width. By that, the thumb and the fingers of the hand can be reliably distinguished from each other and a high spatial resolution is achieved.

Employment of other sensors has also been proposed for HOD applications. WO 2019/086388 A1 describes a system for detecting whether at least one hand of a user is on a steering wheel. The system is in general based on a time-domain reflectometry (TDR) measurement. The system comprises a signal line that extends from a first point to a second point and is disposed along at least a portion of a surface of the steering wheel. The system further includes a detection unit that is coupled to the first point. The detection unit is configured to send a time-dependent detection signal traveling along the signal line, to receive a reflected signal traveling along the signal line and to detect the presence of a hand on the surface based on the reflected signal.

SUMMARY

It is therefore an object of the invention to provide a sensing system of low complexity for hand or body part positioning detection on an object, particularly on a vehicle steering wheel, that is at least capable of distinguishing between scenarios with at least one hand or body part touching the object, no hand or body part touching the steering wheel and at least one hand grasping the object.

This object is achieved by a system for hand or body part detection on an object, particularly on a steering wheel, according to the claims, a steering wheel with hand or body part positioning detection according to the claims, and a method of detecting a hand positioning on an object, particularly on a steering wheel according to the claims.

In one aspect of the present invention, the object is achieved by a sensing system for hand or body part positioning detection on an object, particularly on a rim of a steering wheel, that comprises at least one electrically conducting signal line, a signal voltage source and a control and evaluation unit.

The at least one electrically conducting signal line is arrangeable to extend along a part of a surface of the object with a priori knowledge about a relation between a distance of any portion of the at least one signal line from a reference point and information on a position on the object.

The signal voltage source is operatively connectable to each signal line and is configured for providing a time-dependent measurement signal to be traveling along the respective connected signal line.

The control and evaluation unit is operatively connectable to each signal line and is configured for:
  receiving the measurement signal after being at least partially reflected by at least one portion of the signal line to which the measurement signal has been provided,
  determining a position or positions on the object of the portion or portions of the signal line at least partially reflecting the measurement signal, and
  determining a hand or body part positioning on the object based on the determined position or positions of the portion or portions of the signal line.

The term "signal", as used throughout this application, shall be understood to mean an electric or electromagnetic signal. The phrase "configured to", as used in this application, shall in particular be understood as being specifically programmed, laid out, furnished or arranged. The term "(electrically) connected", as used in this application, shall particularly be understood as being electrically connected by a galvanic connection or a capacitive or inductive coupling.

In general, the sensing system for hand or body part positioning detection according to the invention is based on time-domain reflectometry (TDR), and the provided time-dependent measurement signal intended to be traveling along the respective connected signal line is suitable for TDR measurements. The signal shape of the time-dependent measurement signal may depend on the specific application.

The provided time-dependent measurement signal will be traveling along the respective connected signal line and will at least partially be reflected from any impedance discontinuity along the signal line. Such impedance discontinuities can temporarily be generated by a hand or one or more fingers of the hand or a body part being positioned in proximity to the signal line. The nature of the generated impedance discontinuity or impedance discontinuities is determined by the nature of the hand or body part positioning on the object.

With the a priori knowledge about a relation between a distance of any portion of the at least one signal line from a reference point and information on a position on the object, the proposed sensing system is enabled to determine positions of detected impedance discontinuities on the object. This information can be exploited for determining hand or body part positioning scenarios on the object, such as one or two hands touching or grasping an object such as a steering wheel. The proposed sensing system for hand or body part positioning detection on an object can be of low complexity and can at least be capable of distinguishing between scenarios with at least one hand or body part touching the object, no hand or body part touching the object and at least one hand grasping the object, such as a steering wheel.

Preferably, each signal line is designed to have a predefined uniform characteristic impedance. In this way, impedance discontinuities generated by a touch or grasp of the hand of the operator of the steering wheel stand out better against any other potential impedance disturbances.

Preferably, the proposed sensing system is intended for hand or body part positioning detection on an object that is formed by an automotive vehicle steering wheel and forms part of a steering wheel of an automotive vehicle. The term "automotive vehicle", as used in this patent application, shall particularly be understood to encompass passenger cars, trucks, semi-trailer trucks and buses, although application to other vehicles such as aircrafts (yoke) or watercrafts is also contemplated. Further, the proposed sensing system can be employed for hand or body part positioning detection on steering devices of construction vehicles or agricultural vehicles or the like.

The at least one signal line comprises a first section, which is arrangeable to extend along a part of a surface of the rim of the steering wheel that is facing an operator of the steering wheel, and a second section, which is arrangeable to extend along a part of a surface of the rim of the steering wheel that is facing away from the operator of the steering wheel, wherein the first section and the second section are electrically connected in series.

It is further noted herewith that the terms "first", "second", etc. are used in this application for distinction purposes only, and are not meant to indicate or anticipate a sequence or a priority in any way.

With this configuration, a touch of only one of the surfaces of the rim of the steering wheel by a hand or other body part would generate an impedance discontinuity and, by that, a reflected signal only in either the first portion or the second portion of the signal line, whereas a grasping hand of the operator of the steering wheel would generate two reflections of the measurement signal provided to the signal line at the same position on the rim. Two reflections of the measurement signal provided to the signal line that are detected at different positions on the rim can be attributed to two hands touching the steering wheel. By that, a reliable distinction between a positioning of a touching hand or touching hands and a positioning of a grasping hand or grasping hands of the operator of the steering wheel can be accomplished in an especially easy manner.

Further in such embodiments, the at least one signal line is preferably shaped as a meandering pattern such that a maximum lateral dimension between adjacent turning points of the meandering pattern is more than 25% and less than 50% of a circumferential length of the cross-section of the rim of the steering wheel. In this way, the first section of the signal line is readily arrangeable to extend along a major part of the surface of the rim that is facing an operator of the steering wheel, and the second section of the signal line is readily arrangeable to extend along a major part of the surface of the rim that is facing away from the operator of the steering wheel. It will be appreciated that by the meandering pattern of the signal line, a total length of the signal line that is arrangeable to extend along a part of a surface of a rim of the steering wheel can be enlarged compared to a straight shape, by which a requirement with regard to time resolution can be alleviated. Further, using a meandering pattern can make it easier to cover a large part of the surface of the rim of the steering wheel so as to avoid any "dead zones", meaning areas in which a touch or even a grasp of a hand of a steering wheel operator could be undetected by the sensing system.

Preferably, the meandering pattern comprises half-circle shaped turns connected by straight line portions. In this way, an appropriate signal line of easy design, requiring little manufacturing effort, can be provided.

In preferred embodiments of the sensing system, at least one signal line is designed as a microstrip line or a coplanar waveguide, either of which comprises a flexible dielectric carrier. Microstrip lines and coplanar waveguides are well-known solutions for designing electric transmission lines as signal lines with a well-defined desired uniform impedance. The flexible dielectric carrier can beneficially allow to install the signal line on the surface of the rim of the steering wheel with little wrinkling and almost unnoticeable to the operator of the steering wheel.

Preferably, at least one signal line is terminated by at least one lumped impedance that is equal to the characteristic impedance of the signal line. In this way, reflections of the provided measurements signal at an end of the signal line can be avoided and do not superpose reflections at impedance discontinuities generated by a touch or grasp of the hand of the operator of the steering wheel.

The time-dependent measurement signal does not need to be a pulse signal as is often used in TDR, but can be a continuous signal as well. In preferred embodiments of the sensing system, the signal voltage source is configured for providing a pulse-shaped signal, a frequency-swept signal, a pseudo random phase-shift keyed signal or a pseudo random signal. This can provide design freedom for appropriately covering a wide range of applications.

In the case of a frequency swept sine wave, the control and evaluation unit may be configured to apply a Fast Fourier Transform (FFT) to the received reflected measurement signal. In the case of a pseudo random phase-shift keyed signal or a pseudo random signal, the control and evaluation unit may be configured to apply a cross correlation between the provided measurements signal and the received reflected measurement signal.

In a further aspect of the invention, a steering wheel with hand or body part positioning detection is provided. The steering wheel comprises an embodiment of the sensing system for hand or body part positioning detection as disclosed herein, wherein the at least one electrically conducting signal line is arranged to extend along a part of the surface of the rim of the steering wheel. The benefits described in context with the sensing system applies to the proposed steering wheel to the full extent.

In particular, the proposed steering wheel is applicable with advantage in the automotive sector; i.e. for use in a vehicle. However, it is also contemplated to employ the proposed steering wheel for aircrafts and sea crafts.

In another aspect of the invention, a method of detecting a hand or body part positioning on an object, particularly on a rim of a steering wheel, by operating a sensing system is provided, wherein the sensing system comprises: at least one electrically conducting signal line, which is arranged to extend along a part of a surface of the object with a priori knowledge about a relation between a distance of any portion of the at least one signal line from a reference point and information on a position on the object; a signal voltage source that is operatively connectable to each signal line and a control and evaluation unit that is operatively connectable to each signal line.

The method comprises at least steps of:
by operating the signal voltage source, providing to a signal line a time-dependent measurement signal intended to be traveling along the respective connected signal line,
operating the control and evaluation unit for receiving the measurement signal after being at least partially reflected by at least one portion of the signal line to which the measurement signal has been provided,
operating the control and evaluation unit for determining a position or positions on the object of the portion or portions of the signal line that has or have at least partially reflected the measurement signal, and
operating the control and evaluation unit for determining a hand or body part positioning on the object based on the determined position or positions of the portion or portions of the signal line.

The benefits described in context with the sensing system applies to the proposed method to the full extent.

In preferred embodiments of the method, the step of determining a hand or body part positioning on an object includes determining a hand or body part positioning that is equivalent to a single-touch positioning if only one position of the signal line that has at least partially reflected the measurement signal on the rim has been determined.

In preferred embodiments of the method, if at least two positions of the signal line that have at least partially reflected the measurement signal on the object have been determined, the step of determining a hand or body part positioning on an object includes:
comparing a first determined position on the object of a first portion of the signal line at least partially reflecting the measurement signal to a second determined position on the object of a second portion of the signal line at least partially reflecting the measurement signal,
determining a hand or body part positioning equivalent to touch positionings if the first determined position differs from the second determined position by at least a predefined difference threshold value,
determining a hand or body part positioning equivalent to a grasping hand positioning if the first determined position differs from the second determined position by less than the predefined difference threshold value, and
executing the above steps for all possible pairings of determined positions on the object.

In this way, from a received reflected measurement signal that includes at least two reflections, a hand or body part positioning can reliably be distinguished to be either equivalent to touch positionings or to grasping hand positionings.

In preferred embodiments of the method, a refined hand or body part positioning detection on an object can be obtained. In these embodiments, the step of determining a hand or body part positioning on the object further includes:
comparing an amplitude of a reflected and received measurement signal with a predefined amplitude threshold value that depends on the determined hand or body part positioning being equivalent to a touch positioning or a grasping hand positioning,
determining a refined hand or body part positioning that is equivalent to a strong touch positioning if the determined hand or body part positioning is equivalent to at least a single-touch positioning and if the amplitude is larger than the predefined amplitude threshold value for a touch positioning, and
determining a refined hand or body part positioning that is equivalent to a strong grasp positioning if the determined hand or body part positioning is equivalent to a grasping hand positioning and if the amplitude is larger than the predefined amplitude threshold value for a grasping hand positioning.

Another refined hand or body part positioning detection on an object can be obtained in preferred embodiments of the method, in which the step of determining a hand or body part positioning on the object further includes:
comparing a signal width of a reflected and received measurement signal with a predefined signal width threshold value,
determining a refined hand or body part positioning that is equivalent to a touch positioning of multiple fingers if the determined hand or body part positioning is equivalent to at least a single-touch positioning and if the signal width is larger than the predefined signal width threshold value,
determining at refined hand or body part positioning that is equivalent to full hand grasp positioning if the determined hand or body part positioning is equivalent to a grasping hand positioning and if the signal width is larger than the predefined signal width threshold value.

In preferred embodiments of the method, with the object being formed by a rim of a steering wheel, the step of determining a hand or body part positioning on the object further includes determining a body part positioning equivalent to a knee-driving positioning if the determined hand or body part positioning is equivalent to at least a single-touch positioning and if the position of the signal line that has at least partially reflected the measurement signal on the rim has been determined to be located at a lowest position of the rim in the current position of the steering wheel. This can allow for detection of a misuse condition in which the driver tries to steer the vehicle with the knees.

In preferred embodiments of the method, with the object being formed by a rim of a steering wheel, the step of determining a hand or body part positioning on the object further includes determining a manipulation situation if at least one of the following conditions is fulfilled:

more than four positions on the object of portions of the signal line at least partially reflecting the measurement signal have been determined, and a hand or body part positioning equivalent to a single-touch positioning has been determined for at least a predefined time period.

By detecting a fulfillment of the first condition, a manipulation condition can be detected in which another person than the driver is also touching or even grasping the rim of the steering wheel. By detecting a fulfillment of the second condition, a manipulation condition can be detected in which the rim of the steering wheel is fixed in an impermissible manner.

In yet another aspect of the invention, a non-transitory, computer-readable medium storing a software module for controlling automatic execution of steps of an embodiment of the method disclosed herein is provided.

The method steps to be conducted are converted into a program code of the software module, wherein the program code is implementable in a digital memory unit (such as the computer-readable medium) of the sensing system for hand positioning detection on a steering wheel, and is executable by a processor unit of the sensing system. Preferably, the digital memory unit and/or processor unit may be a digital memory unit and/or a processing unit of the control and evaluation unit of the sensing system. The processor unit may, alternatively or supplementary, be another processor unit that is especially assigned to execute at least some of the method steps.

The software module can enable a robust and reliable execution of the method and can allow for a fast modification of method steps.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

In the different figures, the same parts are always provided with the same reference symbols or numerals, respectively. Thus, they are usually only described once.

DETAILED DESCRIPTION

Figure 1:
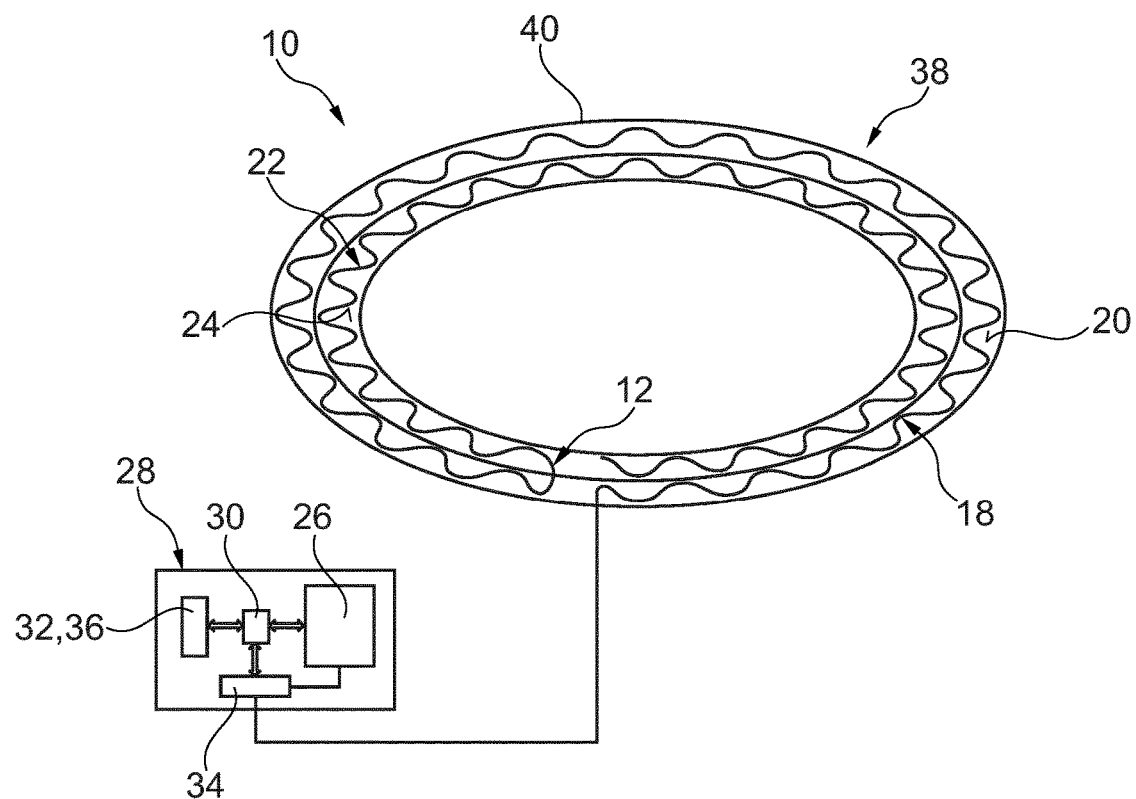
FIG. 1 schematically illustrates a sensing system in accordance with an embodiment of the invention for hand or body part positioning detection on an object formed by a rim of a steering wheel in an installed state, FIG. 2 schematically illustrates the electrically conducting signal line of the sensing system pursuant to FIG. 1, FIG. 3 schematically illustrates the sensing system pursuant to FIG. 1 in a scenario with two hands touching the steering wheel (double touch positioning)

FIG. 1 schematically illustrates a sensing system 10 for hand or body part positioning detection on an object formed by a rim 40 of a steering wheel 38 in an installed state. For clarity purposes, only the rim 40 or steering ring of the steering wheel 38 is shown, which further comprises at least one spoke that connects the rim 40 to a steering column via a hub in a manner known per se. The steering wheel 38 may be employed in a vehicle designed as a passenger car, but may as well be employed in an aircraft or a watercraft.

The sensing system 10 comprises an electrically conducting signal line 12, a signal voltage source 26 and a control and evaluation unit 28.

Figure 2:
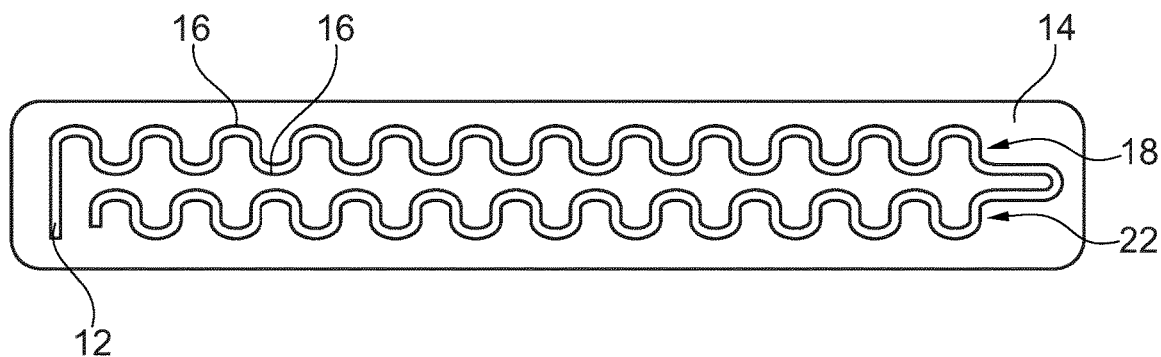

The signal line 12 of the sensing system 10 is schematically illustrated in FIG. 2. The signal line 12 may be shaped as a meandering pattern, which comprises a plurality of half-circle shaped turns connected by straight-line portions. The signal line 12 may be designed as a coplanar waveguide having an electrically conductive center line and two electrically conductive return lines, which are arranged in an equally spaced manner at both sides of the center line. The center line and the return lines may be attached to a flexible dielectric carrier 14 such as a polymeric foil, for instance by applying a screen printing method. In this way, the signal line 12 is designed to have a predefined uniform characteristic impedance, which can be laid out by varying the geometry and relative positions of the center line and the return lines, as is well known in the art.

The flexible dielectric carrier 14 may be backed by an electrically conductive ground plane serving as an additional return line of the coplanar waveguide.

The signal line 12 may be open-ended as shown in FIG. 2, but it may also be terminated by a lumped impedance that is equal to the characteristic impedance so as to avoid reflections at its end. In the open-ended case a total reflection is to be expected, which can be used as a time reference mark.

A maximum dimension between adjacent turning points 16 of the meandering pattern of the signal line 12 is adapted to a circumferential length of a cross-section of the rim 40 of the steering wheel 38 such that a maximum lateral dimension between adjacent turning points 16 of the meandering pattern is more than 25% and less than 50% of a circumferential length of the cross-section of the rim 40 of the steering wheel 38, and in this specific embodiment may be about 30% of the circumferential length.

As shown in FIG. 1, the electrically conducting signal line 12 is arranged to extend along a major part of a surface of the rim 40 of the steering wheel 38. The signal line 12 comprises a first section 18, which is arranged to extend along a major part of a surface 20 of the rim 40 of the steering wheel 38 that is facing an operator of the steering wheel 38, i.e. usually the driver of the vehicle. The signal line 12 further comprises a second section 22, which is arranged to extend along a major part of a surface 24 of the rim 40 of the steering wheel 38 that is facing away from the operator of the steering wheel 38. The first section 18 and the second section 22 of the signal line 12 are electrically connected in series without an impedance discontinuity.

The signal line 12 is installed and arranged on the surface of the rim 40 of the steering wheel 38 with a priori knowledge about a relation between a distance of any portion of the signal line 12 from a reference point and information on a position on the rim 40. Any point of the signal line 12 may be chosen as the reference point. A position of any portion of the signal line 12 on the rim 40 may be defined by specifying the surface, i.e. either the surface 20 facing towards the operator or the surface 24 facing away from the operator, and by specifying a center angle with respect to a zero angle position.

The signal voltage source 26 is operatively connected to the signal line 12 and is configured for providing a time-dependent measurement signal to be traveling along the connected signal line 12. In this embodiment, the signal voltage source 26 is designed as an integral part of the control and evaluation unit 28, sharing the same housing for improved signal processing and control by the control and evaluation unit 28. In other embodiments, the signal voltage source 26 may be designed as a separate unit with appropriate signal and control lines to the signal line 12 and the control and evaluation unit 28.

In this specific embodiment, the signal voltage source 26 is designed for providing pulse-shaped signals, but in other embodiments, the signal voltage source may be configured for providing a frequency-swept signal, a pseudo random phase-shift keyed signal or a pseudo random signal.

The control and evaluation unit 28 is operatively connected to the signal line 12 as well as to the signal voltage source 26. The control and evaluation unit 28 may comprise a microcontroller that includes a digital data memory unit 32, a processor unit 30 with data access to the digital data memory unit 32 and a control interface 34. As will be explained below, the control and evaluation unit 28 is configured for receiving the measurement signal after being at least partially reflected by at least one portion of the signal line 12 to which the measurement signal has been provided, for determining a position or positions on the rim 40 of the portion or portions of the signal line 12 at least partially reflecting the measurement signal, and for determining a hand positioning on the steering wheel 38 based on the determined position or positions of the portion or portions of the signal line 12.

In the following, an embodiment of the method of detecting a hand or body part positioning on the object formed by the rim 40 of the steering wheel 38 by operating the sensing system 10 pursuant to FIG. 1 will be described with reference to FIGS. 1 and 3 to 10 and to FIG. 11, which provides a flow chart of the method. In preparation of operating the sensing system 10, it shall be understood that all involved units and devices are in an operational state and configured as illustrated in FIG. 1.

In order to be able to automatically execute the method, the control and evaluation unit 28 comprises a software module 36. The method steps to be conducted are converted into a program code of the software module 36. The program code is implemented in the digital data memory unit 32 of the control and evaluation unit 28 and is executable by the processor unit 30 of the control and evaluation unit 28. Alternatively, the software module 36 may as well reside in and may be executable by another control unit of the vehicle, and established data communication means between the control and evaluation unit 28 and the vehicle control unit would be used for enabling mutual data transfer.

Figure 11:
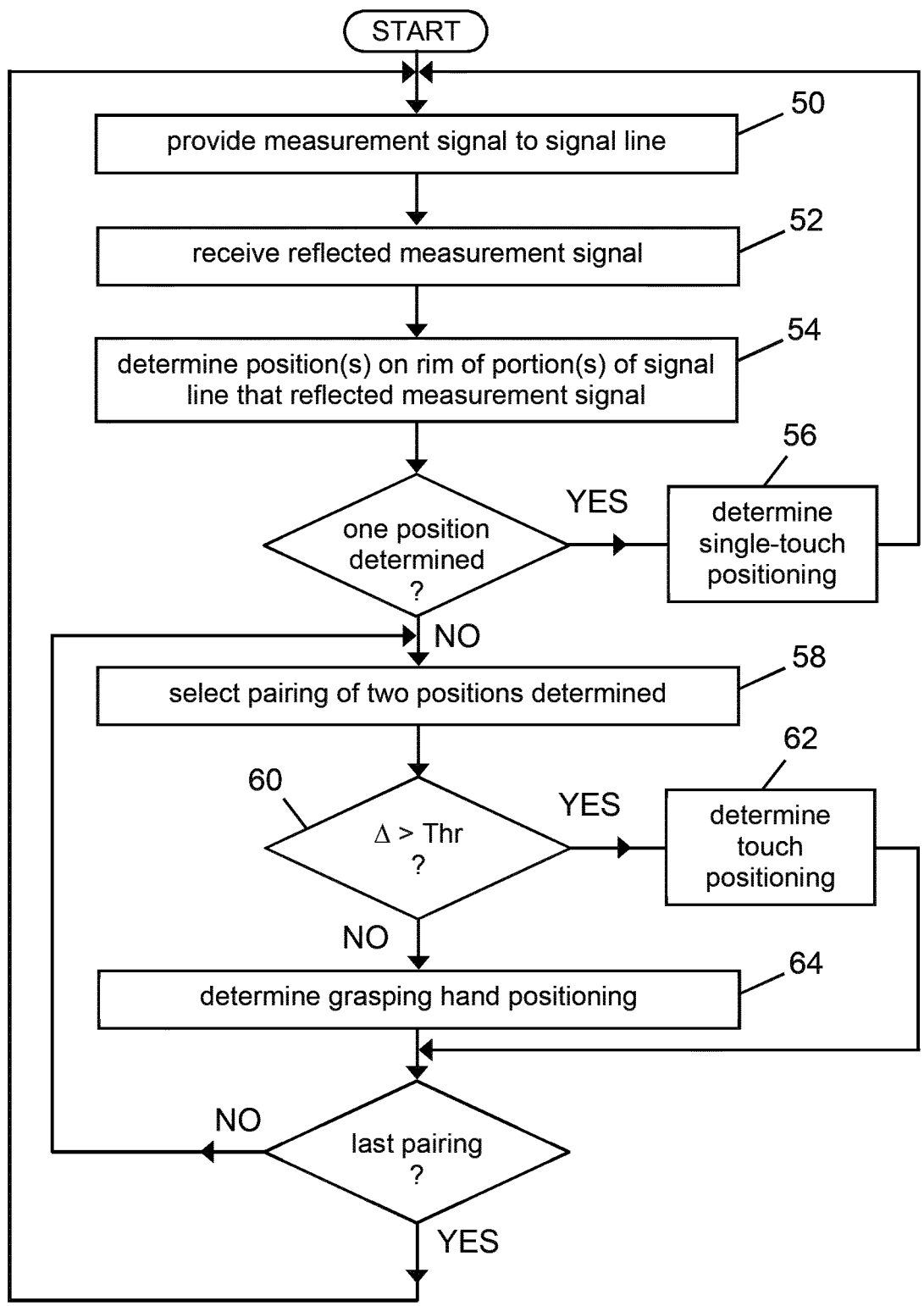
FIG. 11 is a flow chart of a method of detecting a hand positioning on a steering wheel by operating the sensing system pursuant to FIG. 1, and FIGS. 12 to 14 show optional steps of the method pursuant to FIG. 11.

With reference to FIGS. 1 and 11, in a first step 50 of the method, by operating the signal voltage source 26, a time-dependent measurement signal is provided to the signal line 12. The measurement signal is intended to be traveling along the connected signal line 12. Without any hand positioning on the steering wheel 38 and with the signal line 12 being terminated with a lumped impedance, no reflection is expected at all. The provision of the time-dependent measurement signal may be controlled by the control and evaluation unit 28. In other embodiments, the provision of the time-dependent measurement signal may be used as a trigger signal for the control and evaluation unit 28 for commencing execution of the following steps.

In another step 52 of the method, the control and evaluation unit 28 is operated for receiving the measurement signal after being at least partially reflected by at least one portion of the signal line 12 (also referred to as received reflected measurement signal).

In a next step 54, the control and evaluation unit 28 is operated to determine a position or positions on the rim 40 of the portion or portions of the signal line 12 that has or have at least partially reflected the measurement signal. This is obtained by using the a priori knowledge about the relation between a distance of any portion of the signal line 12 from the reference point and information on a position on the rim 40.

In further steps then, the control and evaluation unit 28 is operated to determine a hand positioning on the steering wheel 38 based on the determined position or positions of the portion or portions of the signal line 12.

In case only one position on the rim 40 of the portion of the signal line 12 that has partially reflected the measurement signal has been determined, the control and evaluation unit 28 determines a hand positioning equivalent to a single-touch positioning in a step 56.

Figure 3:
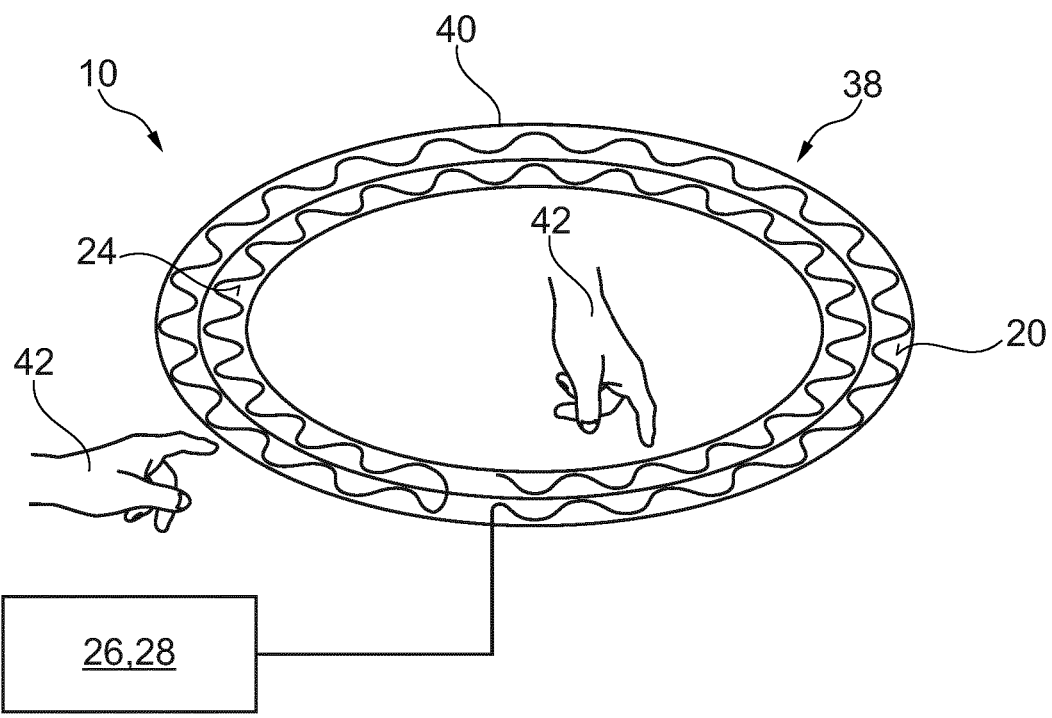

FIG. 3 schematically illustrates the sensing system 10 in a scenario with two hands 42 touching the steering wheel 38 (double touch positioning), wherein one hand 42 is touching the surface 20 of the rim 40 that is facing the operator and the other hand 42 is touching the surface 24 of the rim 40 that is facing away from the operator.

Figure 4:
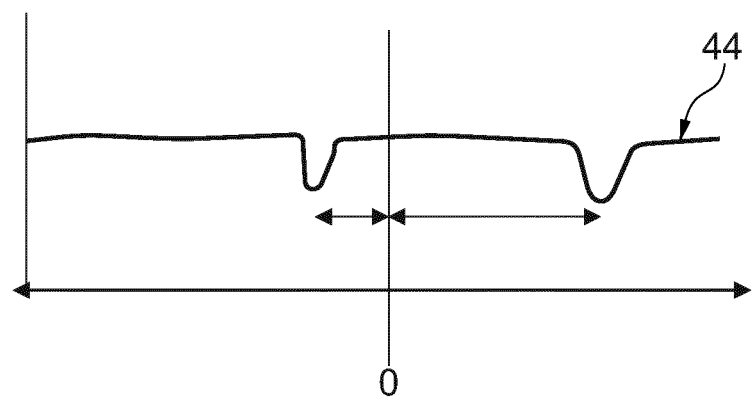
FIG. 4 is a schematic plot of reflected measurement signals received by the sensing system pursuant to FIG. 1 in the scenario pursuant to FIG. 3, FIG. 5 schematically illustrates the sensing system pursuant to FIG. 1 in a scenario with one hand grasping the steering wheel (grasping hand positioning)

FIG. 4 is a schematic plot of reflected measurement signals 44 received by the sensing system 10 pursuant to FIG. 1 in the scenario pursuant to FIG. 3. The ordinate of the plot relates to a signal amplitude, and the abscissa of the plot relates to a circumferential position on the rim 40, starting from the reference point to a portion of the signal line 12, as is determined by the control and evaluation unit 28.

From the received reflected measurement signal 44, two positions of the signal line 12 that have partially reflected the measurement signal on the rim 40 have been determined. In a step 60 of the method, the control and evaluation unit 28 compares the first determined position on the rim 40 of the first determined portion of the signal line 12 partially reflecting the measurement signal to the second determined position on the rim 40 of the second portion of the signal line 12 partially reflecting the measurement signal.

As becomes clear from FIG. 4, the two determined positions differ. More specifically, they differ by an amount that is larger than a predefined difference threshold value Δ. For this result of the step 60 of comparing, the control and evaluation unit 28 determines a hand positioning equivalent to touch positionings in another step 62.

All predefined values, threshold values and conditions mentioned herein may reside in the digital data memory unit 32 of the control and evaluation unit 28 and can readily be retrieved by the processor unit 30 of the control and evaluation unit 28.

Figure 5:
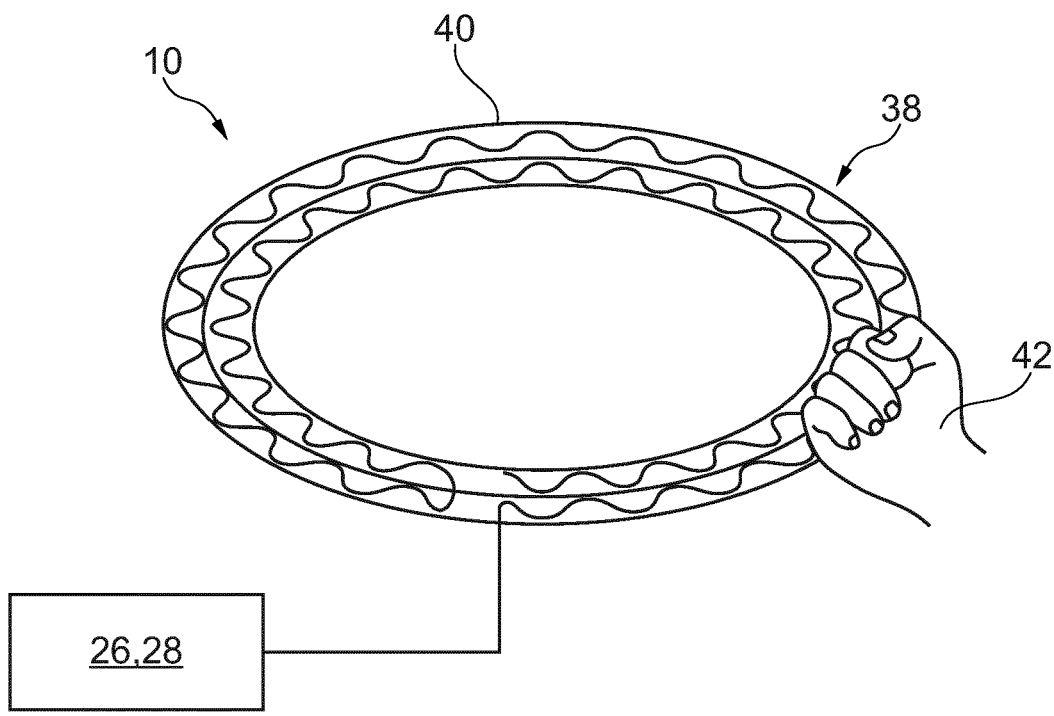
Figure 6:
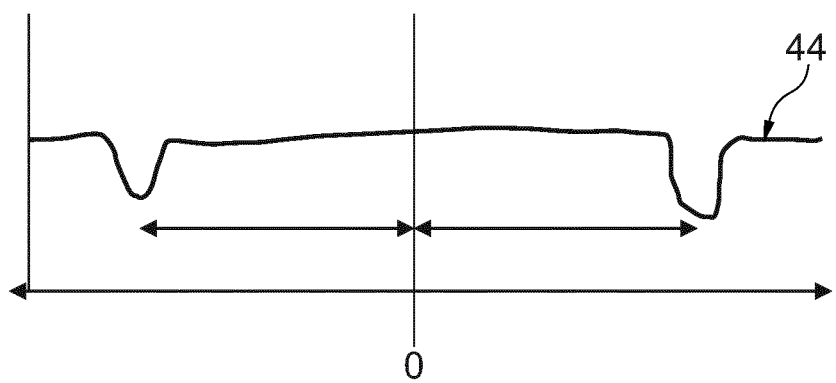
FIG. 6 is a schematic plot of reflected measurement signals received by the sensing system pursuant to FIG. 1 in the scenario pursuant to FIG. 5, FIG. 7 schematically illustrates the sensing system pursuant to FIG. 1 in a scenario with two hands grasping the steering wheel (grasping hand positioning)

FIG. 5 schematically illustrates the sensing system 10 pursuant to FIG. 1 in a scenario with one hand 42 grasping the steering wheel 38 (grasping hand positioning). Again, two positions of the signal line 12 on the rim 40 that have partially reflected the measurement signal have been determined from the received reflected measurement signal 44 (FIG. 6). In contrast to the received reflected measurement signal 44 in FIG. 4, the two positions determined match within the predefined difference threshold value A. For this result of the step 60 of comparing, the control and evaluation unit 28 determines a hand positioning equivalent to a grasping hand positioning in another step 64.

Figure 7:
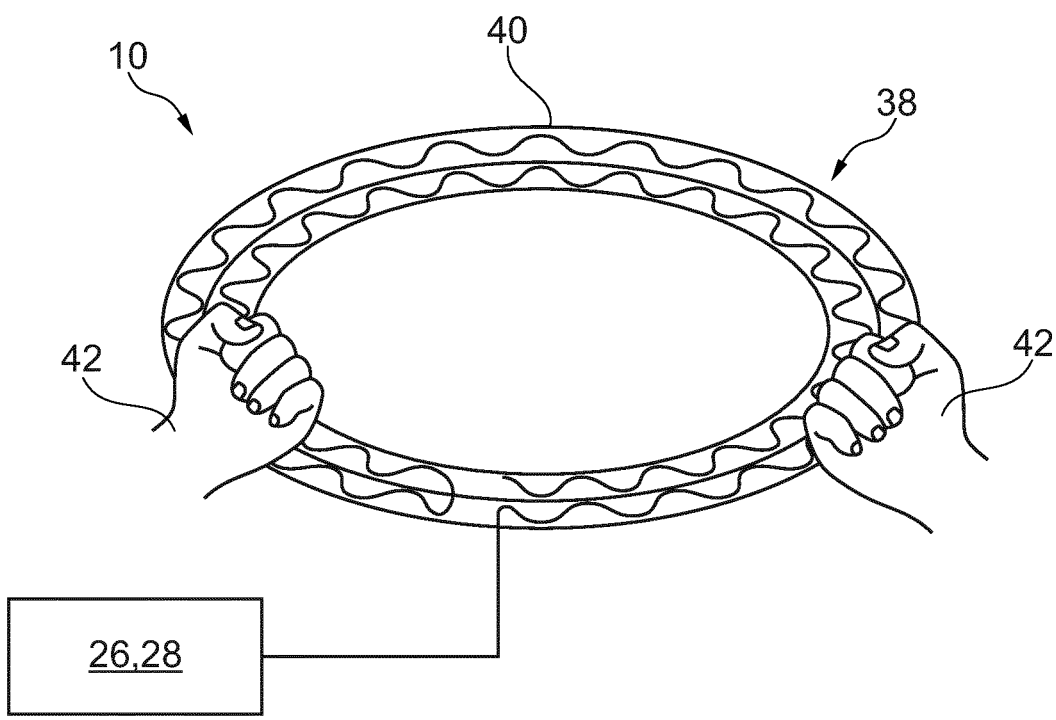
Figure 8:
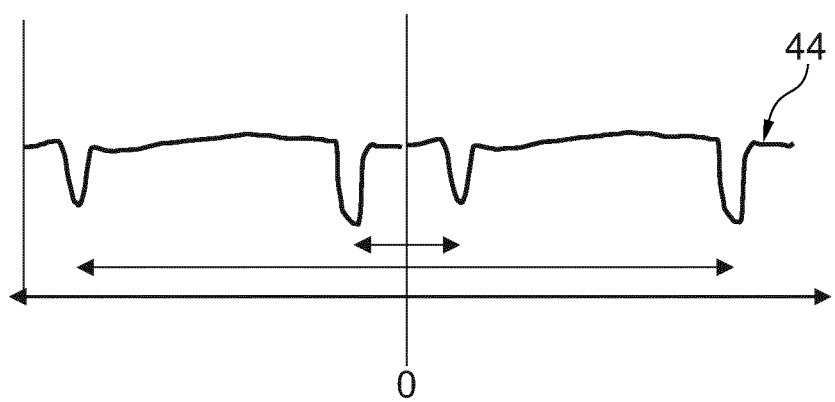
FIG. 8 is a schematic plot of reflected measurement signals received by the sensing system pursuant to FIG. 1 in the scenario pursuant to FIG. 7, FIG. 9 schematically illustrates the sensing system pursuant to FIG. 1 in a scenario with one hand touching the steering wheel and one hand grasping the steering wheel (mixed hand positioning)

FIG. 7 schematically illustrates the sensing system 10 pursuant to FIG. 1 in a scenario with two hands 42 grasping the steering wheel 38 (grasping hand positioning). FIG. 8 is a schematic plot of reflected measurement signals 44 received by the sensing system 10 pursuant to FIG. 1 in the scenario pursuant to FIG. 7.

From the received reflected measurement signal 44, four positions on the rim 40 of the signal line 12 that have partially reflected the measurement signal have been determined. As described before, in a step 58 of the method the control and evaluation unit 28 selects a pairing of a first determined position and a second determined position, compares the first determined position on the rim 40 of a first portion of the signal line 12 partially reflecting the measurement signal to the second determined position on the rim 40 of a second portion of the signal line 12 partially reflecting the measurement signal in a step 60 and determines a hand positioning based on a result of the step 60 of comparison. The step 60 of comparison is executed for all possible pairings among the four determined positions on the rim 40. If two positions determined match within the predefined difference threshold value Δ, the control and evaluation unit 28 determines 64 a hand positioning equivalent to a grasping hand positioning for the pairing of positions under consideration. This is the case for two pairings of positions determined, and the control and evaluation unit 28 determines 64 a hand positioning equivalent to a grasping positioning by two hands 42.

Figure 9:
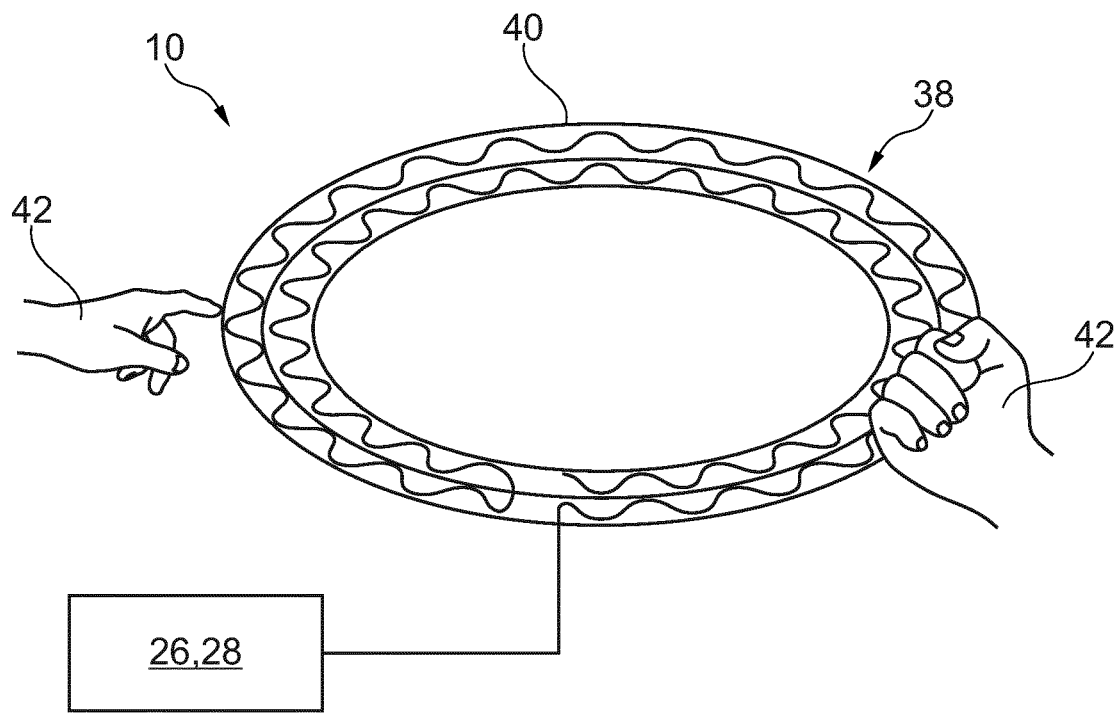
Figure 10:
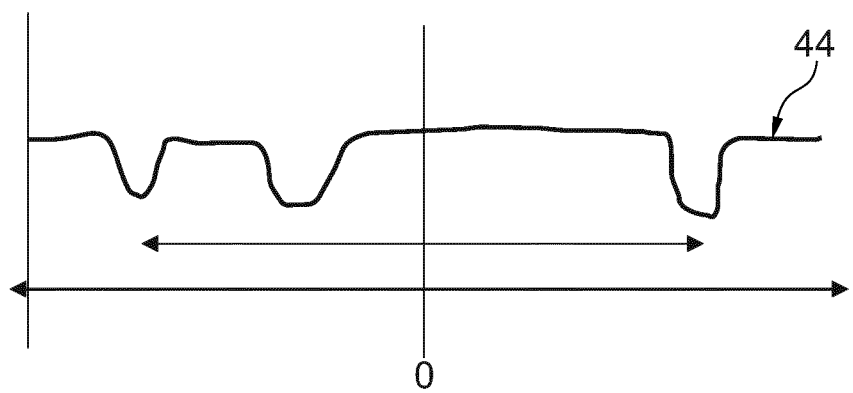
FIG. 10 is a schematic plot of reflected measurement signals received by the sensing system pursuant to FIG. 1 in the scenario pursuant to FIG. 9.

FIG. 9 schematically illustrates the sensing system 10 pursuant to FIG. 1 in a scenario with one hand 42 touching the steering wheel 38 and one hand 42 grasping the steering wheel 38, i.e. a mixed hand positioning. FIG. 10 is a schematic plot of reflected measurement signals 44 received by the sensing system 10 pursuant to FIG. 1 in the scenario pursuant to FIG. 9.

From the received reflected measurement signal 44, three positions on the rim of the signal line 12 that have partially reflected the measurement signal have been determined. As described before, in a step 58 of the method the control and evaluation unit 28 selects a pairing of a first determined position and a second determined position, and in a step 60 of the method the control and evaluation unit 28 compares the first determined position on the rim 40 of a first portion of the signal line 12 partially reflecting the measurement signal to a second determined position on the rim 40 of a second portion of the signal line 12 partially reflecting the measurement signal; and determines a hand positioning based on a result of the step 60 of comparison. The step 60 of comparing is executed for all possible pairings among the three determined positions on the rim 40.

As becomes clear from FIG. 10, two of the three positions determined match within the predefined difference threshold value Δ. For these positions under consideration, the control and evaluation unit 28 determines 64 a hand positioning equivalent to a grasping hand positioning. The third of the three positions differs by an amount that is larger than the predefined difference threshold value Δ from each of the other two positions. For this result of the step 60 of comparing, the control and evaluation unit 28 determines 62 a hand positioning equivalent to a touch positioning for the third position.

For all hand positionings determined for the scenarios as shown in FIGS. 3, 5, 7 and 9, the control and evaluation unit 28 can perform optional steps to determine refined hand positionings.

For the scenarios shown in FIGS. 5 and 7 and the grasping hand positioning determined in the scenario of FIG. 9, the step of determining a hand positioning on the steering wheel may further include to operate the control and evaluation unit 28 to compare an amplitude of the received reflected measurement signal 44 with a predefined amplitude threshold value for a grasping hand positioning. A refined hand positioning that is equivalent to a strong grasp positioning is determined by the control and evaluation unit 28 if the amplitude is larger than the predefined amplitude threshold value for grasping hand positioning, otherwise a standard grasping hand positioning is determined.

Also optionally, the step of determining a hand positioning on the steering wheel may further include to operate the control and evaluation unit 28 to compare a signal width of the received reflected measurement signal 44 with a predefined signal width threshold value. A refined hand positioning that is equivalent to full hand grasp positioning is determined by the control and evaluation unit 28 if the signal width is larger than the predefined signal width threshold value, otherwise a standard grasping hand positioning is determined.

For the scenario shown in FIG. 3 and the touch positioning determined in the scenario of FIG. 9, the step of determining a hand positioning on the steering wheel 38 may further include to operate the control and evaluation unit 28 to compare an amplitude of the received reflected measurement signal 44 with a predefined amplitude threshold value for a touch positioning. A refined hand positioning that is equivalent to a strong touch positioning is determined by the control and evaluation unit 28 if the amplitude is larger than the predefined amplitude threshold value for a touch positioning, otherwise a standard touch positioning is determined.

Also optionally, the step of determining a hand positioning on the steering wheel 38 may further include to operate the control and evaluation unit 28 to compare a signal width of the received reflected measurement signal 44 with a predefined signal width threshold value. A refined hand positioning that is equivalent to a touch positioning of multiple fingers is determined by the control and evaluation unit 28 if the signal width is larger than the predefined signal width threshold value, otherwise a standard touch positioning is determined.

Figure 12:
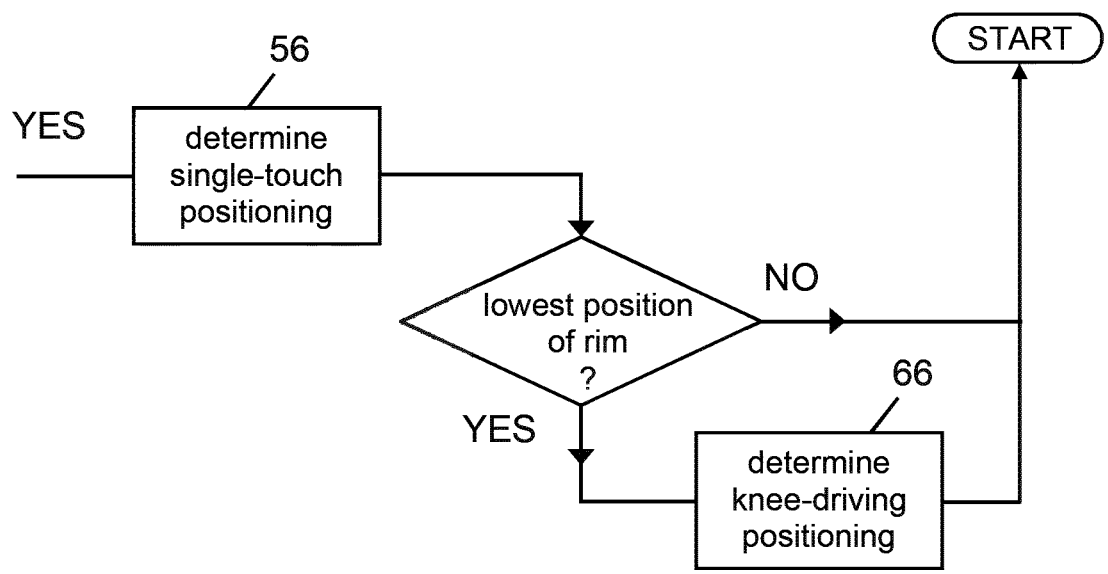
Figure 13:
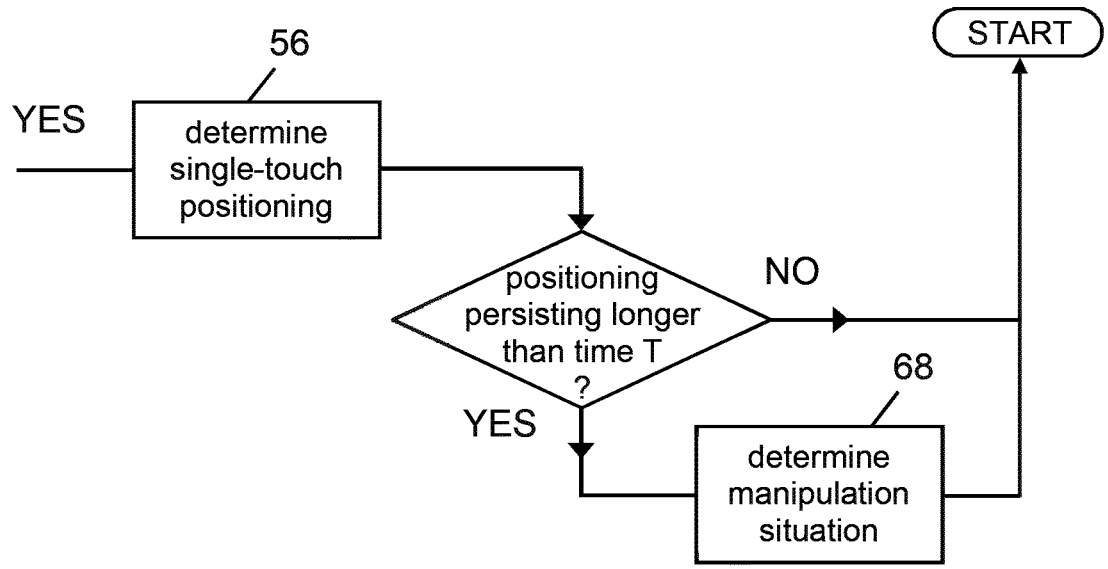
Figure 14:
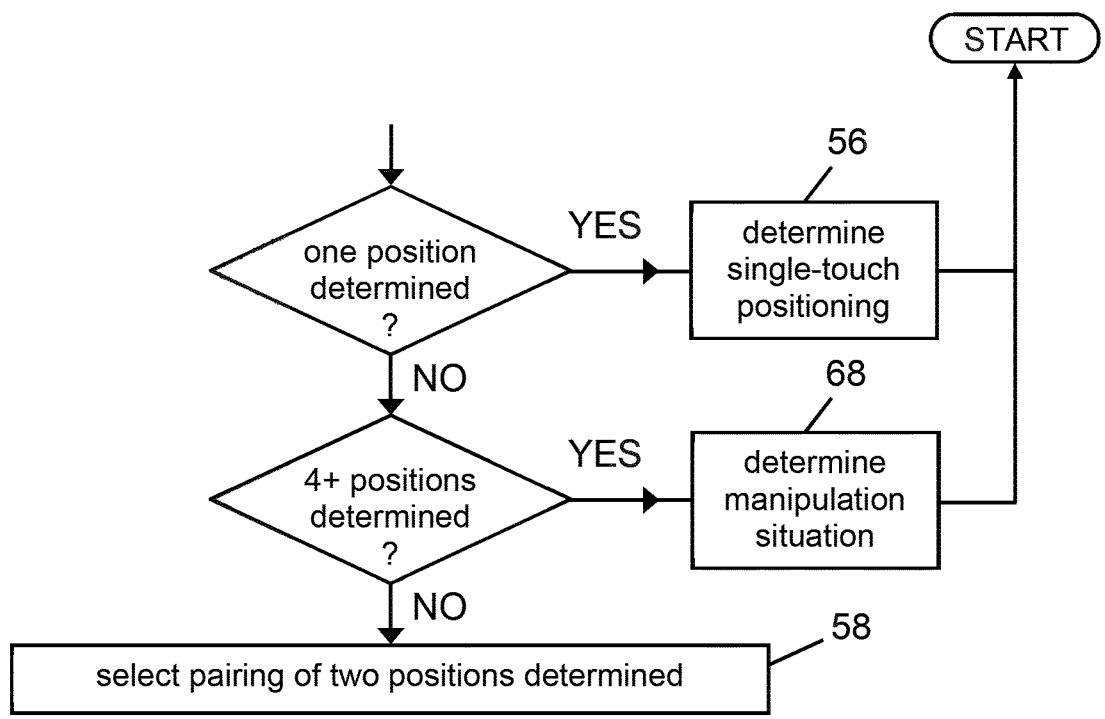

FIGS. 12 and 13 illustrate further optional steps of the method that can allow for misuse detection during driving situations. As one further optional step of the method (FIG. 12), a body part positioning equivalent to a knee-driving positioning can be determined 66 if the determined hand or body part positioning is equivalent to at least a single-touch positioning and if the position of the signal line 12 that has at least partially reflected the measurement signal on the rim 40 has been determined to be located at a lowest position of the rim 40 in the current position of the steering wheel 38.

As yet another optional step of the method (FIG. 13), the step of determining 56, 62, 64 a hand or body part positioning includes determining a manipulation situation 68 if at least one of the following conditions is fulfilled:

more than four positions on the object of portions of the signal line 12 at least partially reflecting the measurement signal have been determined, and a hand or body part positioning equivalent to a single-touch positioning has been determined for at least a predefined time period T.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A sensing system for hand or body part positioning detection on a rim of a steering wheel, the sensing system comprising:

at least one electrically conducting signal line, which is arrangeable to extend along a part of a surface of the rim with a priori knowledge about a relation between a distance of any portion of the at least one signal line from a reference point and information on a position on the rim, a signal voltage source that is operatively connectable to each signal line and that is configured for providing a time-dependent measurement signal to be traveling along the respective connected signal line, and a control and evaluation unit that is operatively connectable to each signal line and that is configured for:

receiving the measurement signal after being at least partially reflected by at least one portion of the signal line to which the measurement signal has been provided, determining a position or positions on the object of the portion or portions of the signal line at least partially reflecting the measurement signal, and determining a hand or body part positioning on the object based on the determined position or positions of the portion or portions of the signal line;

wherein the at least one signal line comprises a first section, which is arrangeable to extend along a part of a surface of the rim of the steering wheel that is facing an operator of the steering wheel, and a second section, which is arrangeable to extend along a part of a surface of the rim of the steering wheel that is facing away from the operator of the steering wheel, wherein the first section and the second section are electrically connected in series; and wherein the control and evaluation unit is further configured for detecting, when at least two positions of the signal line that have at least partially reflected the measurement signal on the rim have been determined, at least one hand grasping the object based on the at least two positions of the signal line that have at least partially reflected the measurement signal on the rim.

2. The sensing system as claimed in claim 1, wherein the at least one signal line is shaped as a meandering pattern such that a maximum lateral dimension between adjacent turning points of the meandering pattern is more than 25% and less than 50% of a circumferential length of the cross-section of the rim of the steering wheel.

3. The sensing system as claimed in claim 1, wherein the meandering pattern comprises half-circle shaped turns connected by straight line portions.

4. The sensing system as claimed in claim 1, wherein at least one signal line is designed as a microstrip line or a coplanar waveguide, either of which comprises a flexible dielectric carrier.

5. The sensing system as claimed in claim 1, wherein at least one signal line is terminated by at least one lumped impedance that is equal to the characteristic impedance.

6. The sensing system as claimed in claim 1, wherein the signal voltage source is configured for providing a pulse-shaped signal, a frequency-swept signal, a pseudo random phase-shift keyed signal or a pseudo random signal.

7. A steering wheel with hand positioning detection, comprising a sensing system as claimed in claim 1, wherein the at least one electrically conducting signal line is arranged to extend along a major part of a surface of a rim of the steering wheel.

8. A method of detecting a hand or body part positioning on a rim of a steering wheel by operating a sensing system comprising at least one electrically conducting signal line, which is arranged to extend along a part of a surface of the object with a priori knowledge about a relation between a distance of any portion of the at least one signal line from a reference point and information on a position on the object, a signal voltage source that is operatively connectable to each signal line, and a control and evaluation unit that is operatively connectable to each signal line, wherein the at least one signal line comprises a first section, which is arrangeable to extend along a part of a surface of the rim of the steering wheel that is facing an operator of the steering wheel, and a second section, which is arrangeable to extend along a part of a surface of the rim of the steering wheel that is facing away from the operator of the steering wheel, wherein the first section and the second section are electrically connected in series, the method comprising at least steps of:

by operating the signal voltage source, providing to a signal line a time-dependent measurement signal intended to be traveling along the respective connected signal line, operating the control and evaluation unit for receiving the measurement signal after being at least partially reflected by at least one portion of the signal line to which the measurement signal has been provided, operating the control and evaluation unit for determining a position or positions on the object of the portion or portions of the signal line that has or have at least partially reflected the measurement signal, and operating the control and evaluation unit for determining a hand or body part positioning on the object based on the determined position or positions of the portion or portions of the signal line;

when at least two positions of the signal line that have at least partially reflected the measurement signal on the rim have been determined, operating the control and evaluation unit for determining at least one hand grasping the object based on at least two positions of the signal line that have at least partially reflected the measurement signal on the rim.

9. The method as claimed in claim 8, wherein the step of determining a hand or body part positioning on an object includes determining a hand or body part positioning equivalent to a single-touch positioning when only one position of the signal line that has at least partially reflected the measurement signal on the rim has been determined.

10. The method as claimed in claim 8, wherein the step of determining a hand or body part positioning on an object includes:

comparing a first determined position on the object of a first portion of the signal line at least partially reflecting the measurement signal to a second determined position on the object of a second portion of the signal line at least partially reflecting the measurement signal, determining a hand or body part positioning equivalent to touch positionings when the first determined position differs from the second determined position by at least a predefined difference threshold value (□), determining a hand or body part positioning equivalent to a grasping hand positioning when the first determined position differs from the second determined position by less than the predefined difference threshold value (□), and executing the above steps for all possible pairings of determined positions on the object.

11. The method as claimed in claim 8, wherein the step of determining a hand or body part positioning on the object further includes:

comparing an amplitude of a reflected and received measurement signal with a predefined amplitude threshold value that depends on the determined hand or body part positioning being equivalent to a touch positioning or a grasping hand positioning, determining a refined hand or body part positioning that is equivalent to a strong touch positioning when the determined hand or body part positioning is equivalent to at least a single-touch positioning and when the amplitude is larger than the predefined amplitude threshold value for a touch positioning, and determining a refined hand or body part positioning that is equivalent to a strong grasp positioning when the determined hand or body part positioning is equivalent to a grasping hand positioning and when the amplitude is larger than the predefined amplitude threshold value for a grasping hand positioning.

12. The method as claimed in claim 8, wherein the step of determining a hand or body part positioning on the object further includes:

comparing a signal width of a reflected and received measurement signal with a predefined signal width threshold value, determining a refined hand or body part positioning that is equivalent to a touch positioning of multiple fingers when the determined hand or body part positioning is equivalent to at least a single-touch positioning and when the signal width is larger than the predefined signal width threshold value, determining a refined hand or body part positioning that is equivalent to full hand grasp positioning when the determined hand or body part positioning is equivalent to a grasping hand positioning and when the signal width is larger than the predefined signal width threshold value.

13. The method as claimed in claim 8, wherein the object comprises a rim of a steering wheel, and wherein the step of determining a hand or body part positioning on the object further includes determining a body part positioning equivalent to a knee-driving positioning when the determined hand or body part positioning is equivalent to at least a single-touch positioning and when the position of the signal line that has at least partially reflected the measurement signal on the rim has been determined to be located at a lowest position of the rim in the current position of the steering wheel.

14. The method as claimed in claim 8, wherein the object comprises a rim of a steering wheel, and wherein the step of determining a hand or body part positioning on the object further includes determining a manipulation situation when at least one of the following conditions is fulfilled:

more than four positions on the object of portions of the signal line at least partially reflecting the measurement signal have been determined, and a hand or body part positioning equivalent to a single-touch positioning has been determined for at least a predefined time period.

15. A non-transitory, computer-readable medium having stored thereon a software module for controlling automatic execution of the method as claimed in claim 8, wherein method steps of the method comprise a program code of the software module, wherein the program code is executable by a processor unit.

* * * * *